United States Patent
Burney et al.

(10) Patent No.: US 6,871,414 B2
(45) Date of Patent: Mar. 29, 2005

(54) APPARATUS AND METHOD FOR MEASURING AND ADJUSTING GOLF CLUB LOFT AND LIE

(75) Inventors: David Burney, Ramona, CA (US); Jacobus J. Hageman, San Diego, CA (US); Carson Whitsett, San Diego, CA (US); James F. Morse, Poway, CA (US)

(73) Assignee: Taylor Made Golf Company, Inc., Carlsbad, CA (US)

( * ) Notice: Subject to any disclaimer, the term of this patent is extended or adjusted under 35 U.S.C. 154(b) by 0 days.

(21) Appl. No.: 10/431,790

(22) Filed: May 8, 2003

(65) Prior Publication Data

US 2004/0221464 A1 Nov. 11, 2004

(51) Int. Cl.[7] .................................................. G01B 5/24
(52) U.S. Cl. ............................ 33/508; 33/549; 473/244
(58) Field of Search ........... 33/508, 549; 473/244–248; 382/154

(56) References Cited

U.S. PATENT DOCUMENTS

| | | |
|---|---|---|
| 3,439,429 A | 4/1969 | Sundstrom |
| 3,965,714 A | 6/1976 | Beard |
| 4,094,072 A | 6/1978 | Erb |
| 4,245,391 A | 1/1981 | Heller |
| 4,245,392 A | 1/1981 | Heller |
| 4,549,357 A | 10/1985 | Hilrose |
| 4,622,836 A | 11/1986 | Long et al. |
| 4,640,017 A | 2/1987 | Cukon |
| 4,750,537 A * | 6/1988 | Green ......................... 144/363 |
| 4,858,332 A | 8/1989 | Thomas |
| 4,875,293 A | 10/1989 | Wakefield |
| 5,327,766 A * | 7/1994 | Humphreys .................. 72/316 |
| 5,421,098 A | 6/1995 | Muldoon |
| 5,884,409 A | 3/1999 | Muldoon |
| 6,260,250 B1 | 7/2001 | Hall et al. |
| 6,363,620 B1 | 4/2002 | Goodjohn |
| 6,415,502 B1 * | 7/2002 | Gunshinan et al. ........... 29/714 |

FOREIGN PATENT DOCUMENTS

| | | | |
|---|---|---|---|
| GB | 2269022 | | 1/1994 |
| JP | 2193001 | | 7/1990 |
| JP | 03198876 A | * | 8/1991 |
| JP | 10337344 A | * | 12/1998 |

* cited by examiner

Primary Examiner—Christopher W. Fulton
Assistant Examiner—Tania Courson
(74) Attorney, Agent, or Firm—Sheppard, Mullin, Richter & Hampton LLP

(57) ABSTRACT

The invention provides an apparatus and method for measuring loft and lie angles of a golf club. The apparatus includes a clamping assembly configured to secure the head of a golf club in a stationary position and a shaft sensor system having two cameras spaced apart from the clamping assembly to provide a stereoscopic view of a shaft of the club. The orientation of each of the two cameras is known relative to the face of the club head. A computing device is programmed to use information received from the two cameras to calculate loft and lie angles of the golf club.

15 Claims, 9 Drawing Sheets

APPARATUS AND METHOD FOR MEASURING AND ADJUSTING GOLF CLUB LOFT AND LIE

FIELD OF THE INVENTION

This invention relates generally to golf clubs and, more particularly, to apparatus and methods for measuring and adjusting a golf club's loft and lie.

BACKGROUND OF THE INVENTION

Loft and lie angles are important characteristics of a golf club. Unintended variations in loft and lie can have a pronounced effect on a golf club's performance. As such, the manufacture of golf clubs often includes steps of measuring and, if necessary, adjusting loft and lie. Also, golf clubs can be customized to a particular golfer by adjusting loft and lie.

Adjustments are commonly performed using an iterative approach. First, loft and lie are measured using a particular device for that purpose, e.g., an angle inspection device. Typically, a technician clamps the club to the device in a prescribed orientation and reads the angle measurements off protractor-like analog scales. Such devices typically have an accuracy of only ±0.5 degrees when used by a skilled technician. Those of less skill may have difficulty properly aligning the club in the device and properly reading the analog scales, resulting in measurements that are even less accurate. If adjustments are required, the technician secures the club to a clamping device and applies force to bend the hosel, thereby adjusting loft and lie to the desired degree. However, the direction and amount of force applied is at the technician's estimation. Thereafter, the technician returns the club to the measuring apparatus to assess whether additional bending will be necessary. This process is repeated until the desired loft and lie are achieved.

Current approaches are highly dependent upon the skill of the technician, and even the most skilled typically cannot achieve accuracy better than ±0.5 degrees. Even a skilled technician often requires several attempts to achieve the desired angles. However, multiple bending attempts can weaken the club head, particularly the hosel, and increase the risk of breakage.

It should, therefore, be appreciated there is a need for an apparatus for measuring and adjusting golf clubs that allows a technician to achieve improved accuracy m measuring and adjusting a golf club's loft and lie without unduly weakening the club. The present invention fulfills this need as well as others.

SUMMARY OF THE INVENTION

The present invention provides an apparatus, and a related method, for measuring and adjusting golf club loft and lie that provides improved accuracy without unduly weakening the club. The apparatus includes a clamping assembly configured to secure a golf club head in a stationary position and a shaft sensor system having two cameras spaced apart from the clamping assembly to provide a stereoscopic view of a shaft of the club. The apparatus further includes a computing device programmed to use information received from the shaft sensor system to provide real-time calculations of loft and lie angles of the club. In use, a technician can measure and adjust loft and lie without transferring the club from one device to another. Also, the progress toward achieving the desired loft and lie can be monitored while doing an adjustment. Moreover, the apparatus is relatively easy to use, thereby allowing even less skilled technicians to adjust loft and lie within tight tolerances.

In a preferred embodiment, the apparatus further includes a positional system in communication with the computing device. The positional system includes first sensor, e.g., a clamp inclinometer, mounted to the clamping assembly and a second sensor, e.g., a structure inclinometer, mounted to the supporting structure. The sensors are preferably configured to sense orientation in two axes relative to gravity. In this manner, the relative orientation of a club head in the clamping assembly and the shaft sensor system can be provided.

In a detailed aspect of a preferred embodiment, the apparatus includes a clamp mount joining the clamping assembly to a supporting structure. The clamp mount has an x-axis trunnion and a y-axis trunnion to provide two degrees of freedom for the clamping assembly.

In another detailed aspect of a preferred embodiment, the apparatus includes a face sensor system disposed about the clamping assembly to monitor the orientation of the club face and, preferably, the face sensor system has a camera positioned to view a club face within the clamping assembly.

In an independent aspect of the present invention, a clamping assembly configured to securely support a club head while bending forces are applied is provided. The clamping assembly includes a face wall positioned to support a club face of the club head and a stationary side wall positioned to support the first longitudinal edge of a club head. The clamping assembly further includes two movable constraint blocks positioned in spaced relationship to the side wall to engage the second longitudinal edge of the club head. The blocks move independently relative to one another and are driven to engage the second longitudinal edge. The walls and the constraint blocks have compliant contact surfaces for engaging the club head without marring.

In a detailed aspect of a preferred embodiment, the contact surfaces of the side wall and the movable constraint blocks are angled toward the face wall, thereby encouraging the club face to mate flush with the face wall as the constraint blocks engage the second longitudinal edge of the club head.

In another detailed aspect of a preferred embodiment, the clamping assembly further including a second stationary side wall positioned on an opposite side of the constraint blocks relative to the first side wall; wherein the face wall extends between the first and second side walls.

In another independent aspect of the invention, the shaft sensor system and the computing system are configured locate the shaft within a three-dimensional coordinate system and, preferably, a center line of the shaft is computed based upon the resulting stereoscopic view. In preferred embodiment, a linear array of lighting devices is orthogonally aligned relative to the mounting plane of the shaft sensor system to illuminate the shaft.

Other features and advantages of the present invention should become apparent from the following description of the preferred embodiments, taken in conjunction with the accompanying drawings, which illustrate, by way of example, the principles of the present invention.

BRIEF DESCRIPTION OF THE DRAWINGS

Embodiments of the present invention will now be described, by way of example only, with reference to the following drawings in which.

Figure 1:
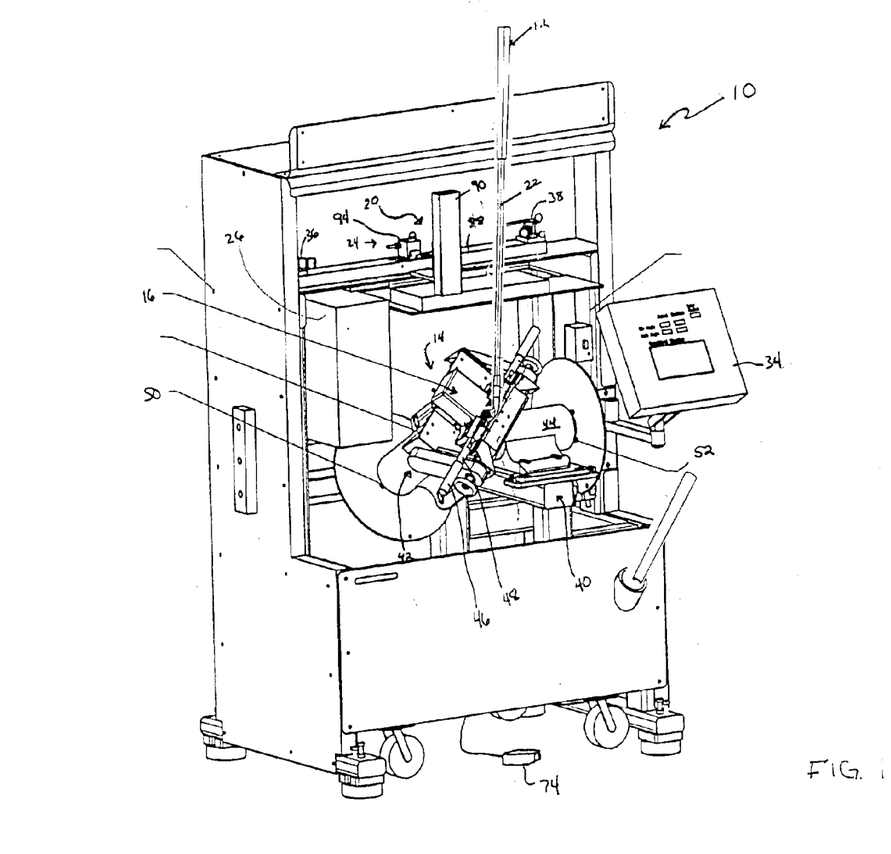
FIG. 1 is a front perspective view of an apparatus for measuring and adjusting golf club loft and lie in accordance with the invention.
Figures 2, 3:
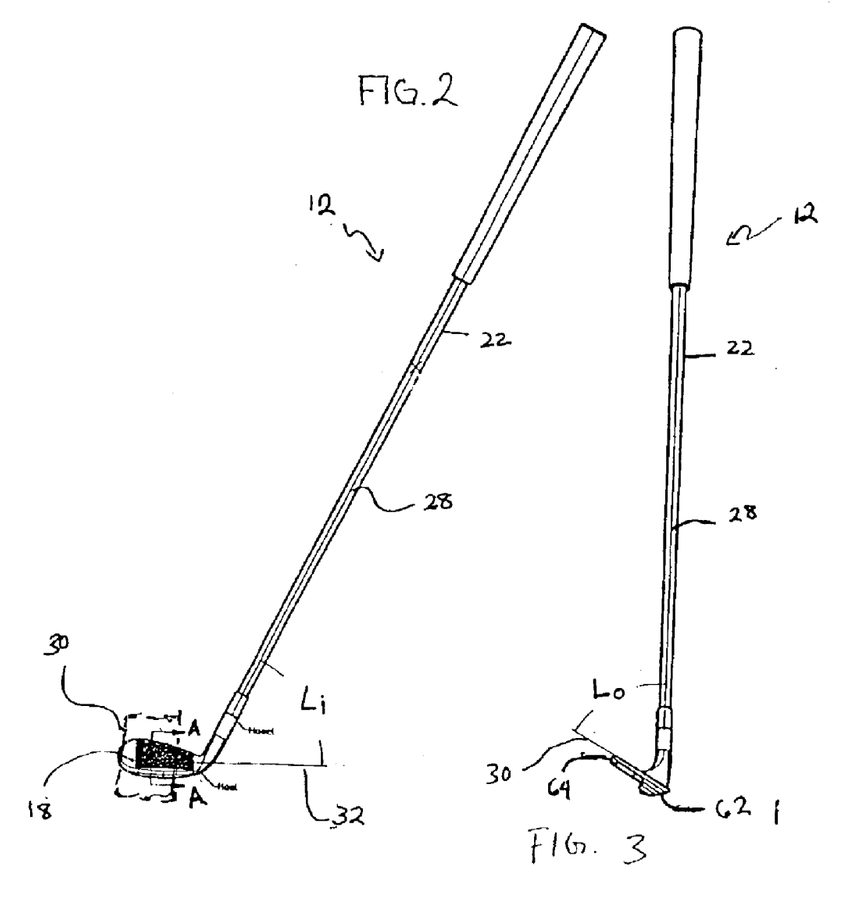
FIG. 2 is a perspective view of a golf club, depicting a lie and shaft lines and a face plane.
FIG. 3 is a cross-sectional view taken along line A—A of the golf club of FIG. 2, depicting a loft angle.

With reference to the illustrative drawings, and particularly FIG. 1, there is shown an apparatus 10 for measuring and adjusting the loft and lie of a golf club 12. The apparatus 12 includes a clamping assembly 14 that securely receives the head of the golf club 12 and a plurality of sensor systems configured to provide real-time monitoring. A face sensor system 16 is disposed about the clamping assembly 14 to monitor the orientation of the club face 18. A shaft sensor system 20 is spaced apart from the clamping assembly 14 to monitor orientation of the club's shaft 22, and a positional sensor system 24 is disposed about the apparatus 12 to provide positional relationship of a club face 18 and the shaft sensor system 20. The apparatus 10 includes a computer 26 that receives data from the sensor systems from which it calculates loft and lie. Loft and lie angles ($L_0$, $L_1$, respectively) are measured from an axial line of the shaft 22, i.e., shaft line 28, to a face plane 30 and a lie line 32, respectively (FIGS. 2 and 3). Loft and lie information is graphically displayed in real-time on a touch screen monitor 34, to depict progress toward a desired loft and lie while an adjustment is underway. Thus, the apparatus 10 is relatively easy to use, allowing minimally skilled technicians to adjust loft and lie within tight tolerances.

The shaft sensor system 20 includes two shaft cameras sensitive to infrared (IR) light, i.e., an x-axis shaft camera 36 and a z-axis shaft camera 38, spaced apart from each other to provide a stereoscopic view of the shaft 22. Alternatively, any imaging system that can be configured to provide a stereoscopic view can be used, including video cameras, photocell devices, and laser scanners. Given the stereoscopic view of the shaft 22 the shaft line 28 can be defined three-dimensionally relative to the shaft cameras 36, 38 without the need to maintain the shaft 22 stationary. If the orientation of the two shaft cameras 36, 38 is known relative to the club face 18 loft and lie can be determined, in this embodiment, the positional sensor system 24 serves to monitor the relative orientation of the face plane 30 and shaft cameras 36, 38 and the face sensor system 16 monitors the orientation of the lie line 32 along the face plane 30. In other embodiments, the relative orientation of the clamping assembly 14 and shaft sensor system 20 can be structurally fixed or measured prior to use.

With continued reference to FIG. 1, the clamping assembly 14 is rotatably mounted for two degrees of freedom to a clamp mount 40 having an x-axis trunnion 42, and a y-axis trunnion 44. Handles 46 are provided for rotating the clamping assembly 14 and actuators 48 are disposed thereon that release brakes 50, 52 attached to each trunnion 42, 44. In use, the technician rotates the clamping assembly 14 so the club shaft 22 is generally vertical, thereby centering the shaft 22 in stereoscopic view of the shaft sensor system 20. Once in the desired orientation, the user releases the actuators 48 activating the brakes 50, 52 to lock the clamping assembly 14 in place.

Figure 4:
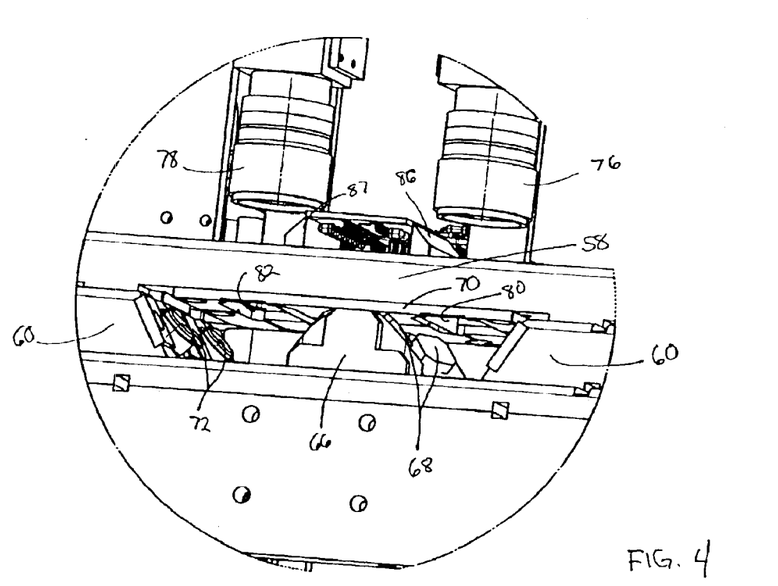
FIG. 4 is a close-up, perspective view of the clamping assembly of the apparatus of FIG. 1, depicting movable constraint blocks.
Figure 5:
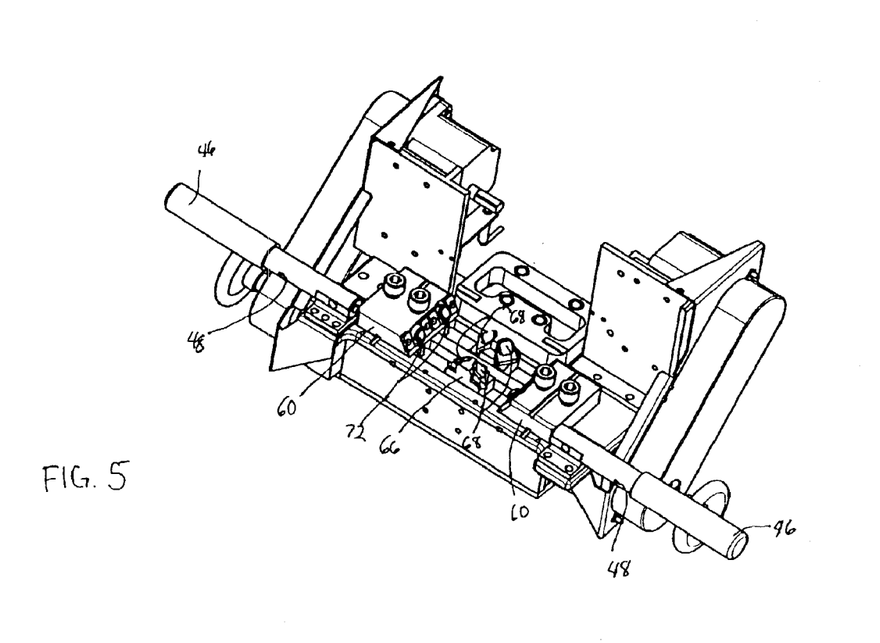
FIG. 5 is a perspective view of the clamping assembly of the apparatus of FIG. 4, with a top plate removed.

With reference now to FIGS. 4 and 5, the clamping assembly 14 defines two club-head pockets 54, 56, one for right-handed clubs and another left-handed clubs. The clamping assembly 14 includes a rigid face wall 58 for engaging the club face 18 and stationary side walls 60 each for supporting a sole 62 (FIG. 3) of the club head. A top edge 64 (FIG. 3) of the club head is supported by movable constraint blocks 66 of the clamping assembly 14. Top-edge mar pads 68 are pivotally mounted to the constraint blocks 66 for both right-handed and left-handed clubs. The clamping assembly 14 further includes a face rear pad 70 attached to the face wall 58 and sole mar pads 72 pivotally attached to the side walls 6o. The mar pads 68, 70, 72 provide a compliant contact surface for the club head. The club head is inserted such that the sole 62 abuts the sole mar pads 72 and the club face 18 is generally flush against a face mar pad 70. The clamping assembly 14 is configured to withstand relatively significant bending force applied to the club 12 while maintaining the club head secure.

The clamping assembly 14 further includes motors having stall sensors (not shown) operable by a foot pedal 74 (FIG. 1) to drive the constraint blocks 66. The constraint blocks 66 slide independently of one another until the top-edge mar pads 68 securely abut the top edge 64 of the club head, at which point the motors will stop. The constraint blocks 66 securely maintain their position even in the face of relatively significant bending force applied to the club 12. Preferably, the sole mar pads 72 of the side walls 60 and the movable constraint blocks 66 are angled toward the face wall 58. Thus, as the constraint blocks 66 engage the top edge 64 of the club head, the club face 18 is encouraged to mate flush with the face wall 58.

Figure 6:
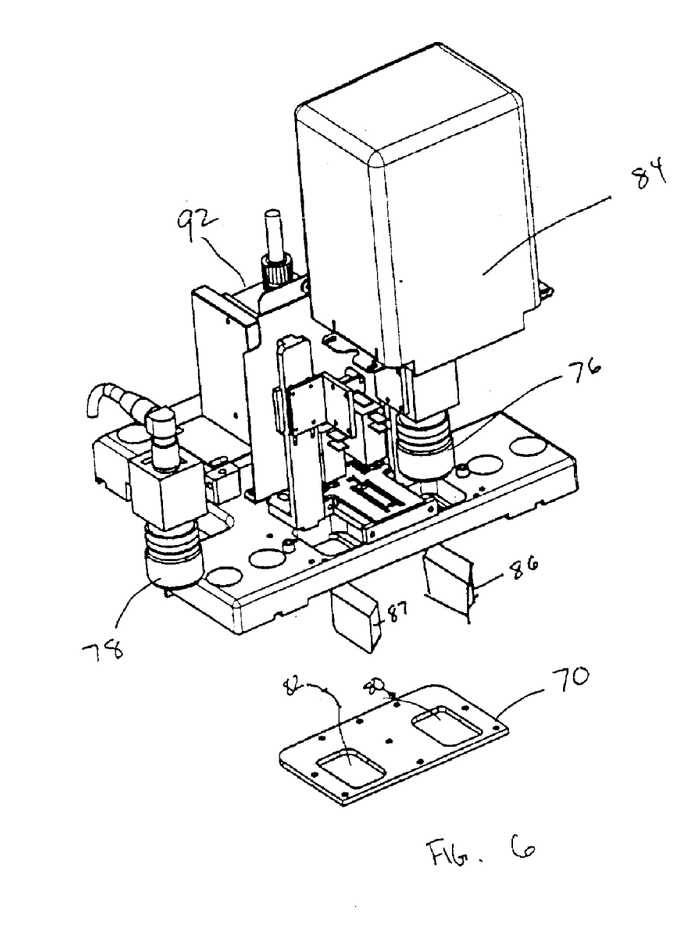
FIG. 6 is a partially exploded view of the face sensor system of the apparatus of FIG. 1, depicting the face sensor system and relative positioning to a face pad of the clamping assembly.

With reference now to FIGS. 1 and 6, the face sensor system 16 includes two IR-sensitive cameras, i.e., left and right face cameras 76, 78, for viewing left and right handed clubs respectively, each positioned over an opening 80, 82 in the face wall 58 such that the corresponding face camera 76, 78 can view a club face 18 abutted thereto. The face sensor system 16 further includes a lighting device 86 to illuminate the club face 18. The lighting device 86 includes two rows of red LEDs (not shown) mounted to a board, such that there is one row for each of the left and right-handed club head pocket 54, 56. The light from the LEDs is routed to the club face 18 via a light pipe 87, and the reflection of the light off the club face 18 is received by the corresponding face camera 76, 78. The face camera 76, 78 and the lighting device 86 are oriented such that the grooves of the club face 18 show prominently. Each face camera 76, 78 is mounted such that the resulting images are orthogonally aligned with the clumping assembly 14. Thus, the angle of the grooves in the resulting image relates to the lie line 32 orientation in the face plane 30 (FIG. 2).

With reference again to FIG. 1, shaft cameras 36, 38 are mounted to a lateral support 88 positioned above the clamping assembly 14. The shaft cameras 36, 38 are spaced apart and directionally oriented at a 90-degree angle relative to one another such that the stereoscopic view is centered on the vertically oriented shaft 22 extending from the clamping assembly 14. The shaft sensor system 20 further includes a shaft lighting device 90 generally centered between the shaft cameras 36, 38 for illuminating the shaft 22. In this embodiment, the shaft lighting device 90 is a linear array of IR lighting devices orthogonally aligned relative to the mounting plane of the shaft cameras 36, 38. This configuration provides sufficient light along the shaft's length and throughout its range of motion.

With reference again to FIGS. 1 and 6, the positional sensor system 24 includes a clamp inclinometer 92 mounted to sense the orientation of the clamping assembly 14 and a structure inclinometer 94 mounted to sense the orientation for the structure. In this embodiment, the structure inclinometer 94 is mounted to the lateral support 88 to which the shaft cameras 36, 38 are mounted. The inclinometers 92, 94 measure orientation in two axes relative to gravity and both inclinometers 92, 94 are aligned with the x and y axes of the clamping assembly 14. The clamp inclinometer 92 is mounted to be generally planar with a club face 18 secured by the clamping assembly 14, thereby allowing the orientation of the shaft cameras 36, 38 relative to the club face 18 to be determined. Since the inclinometers 92, 94 provide relative alignment to one another, it is not necessary for the apparatus 10 to be precisely level. In other embodiments, any sensor system that can be configured to provide positional relationship of the club face 18 and the shaft sensor system 20 can be used, including those implementing gyroscopes, levels and other positional sensors, either singly or in combination. Alternatively, this positional relationship can be fixed.

Figure 7:
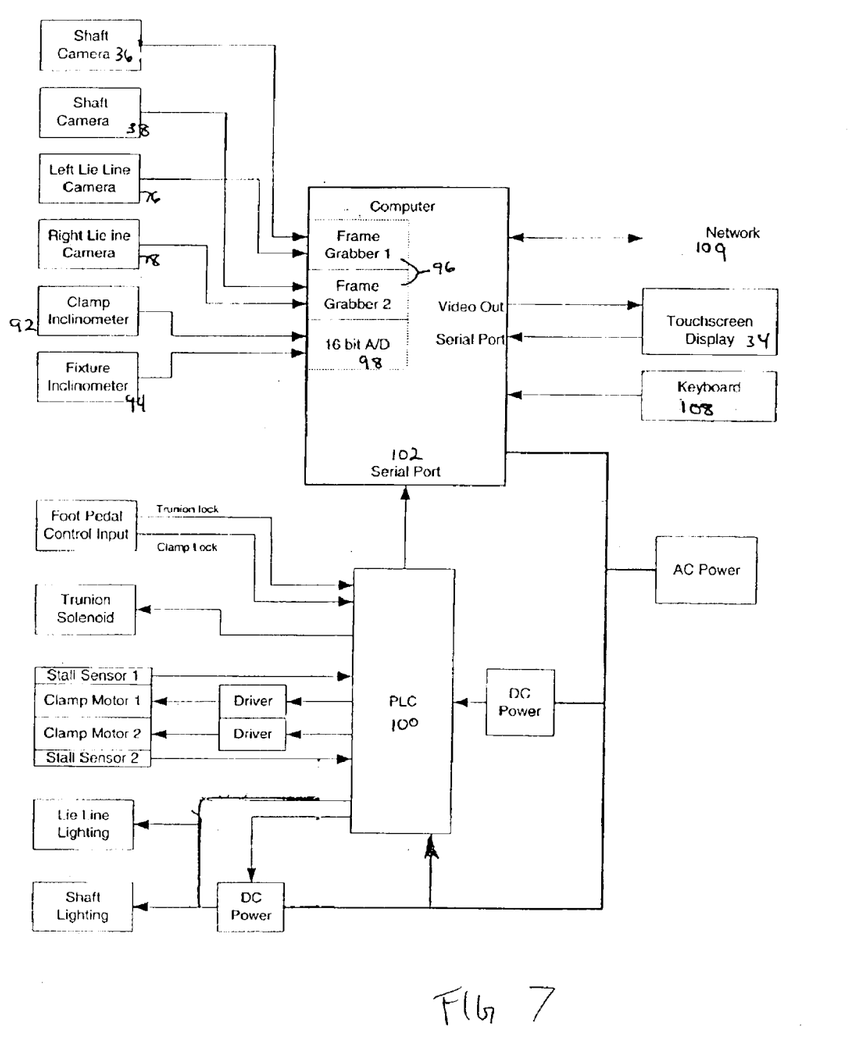
FIG. 7 is a simplified block diagram of sensor systems, computer and control system of the apparatus of FIG. 1.

With reference now to FIG. 7, the sensor system 16, is controllable from the computer 26. The computer 26 includes input cards, frame grabbers 96 much as Imagenation® PXR 800, for receiving video input from the cameras 36, 38, 76, and 78 and an analog/digital (A/D) card 98 for receiving input from the inclinometers 92, 94. A programmable logic controller (PLC) 100, is connected to a serial port 102. The PLC 100 receives input from the foot pedal 74, air pressure actuators 48, and the x- and y-axis trunnion brakes 50, 52 and serves to control operation of the clamping assembly 14. The PLC 100 also provides data to the computer 26 regarding the state of the clamping assembly 14 for display to the technician, which is displayed upon the monitor 34.

The computer 26 computes shaft angle measurements at a rate of twelve per second, correlating to capturing at least twelve frames per second from each shaft camera 36, 38. Since the club head is generally static within the clamping assembly 14, it is monitored primarily for slippage. The computer 26 computes lie line measurements at a rate of two per second, correlating to capturing at least two frames per second from each shaft camera 36, 38. Once the clamping assembly 14 is oriented, the inclinometers 92, 94 are also generally static. Measurements of the inclinometers 92, 94 are updated twice per second. Differences in measurement are often attributable to chassis deflection during high force bending.

Figure 8:
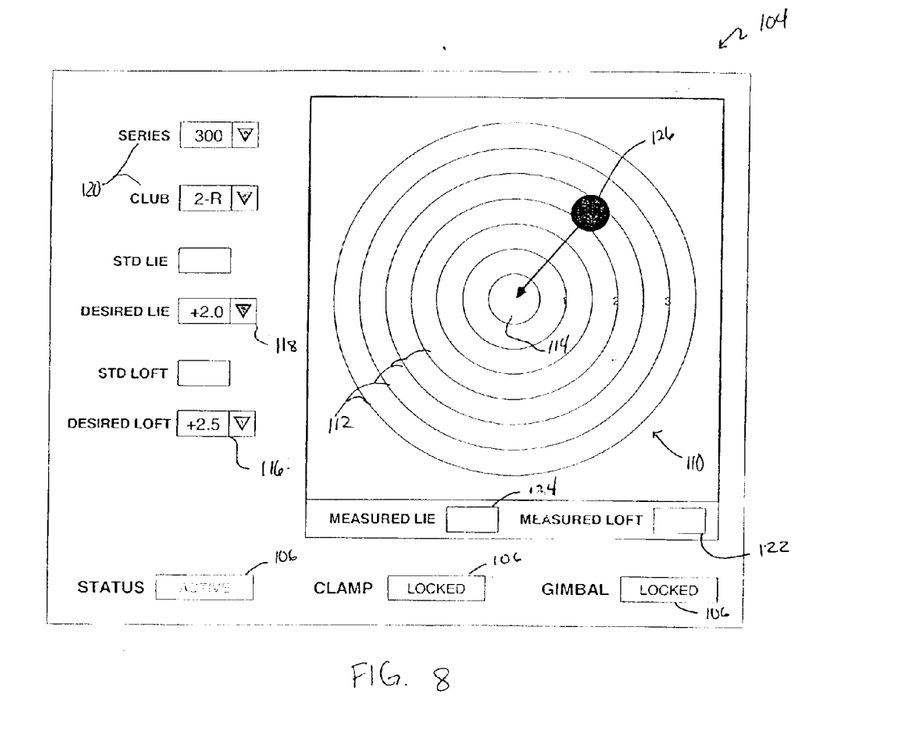
FIG. 8 is a simplified display screen generated by a computing device of the apparatus of FIG. 1, depicting a bull's-eye chart having concentric rings centered on a bull's-eye for monitoring progress toward a desired loft and lie.

With reference now to FIG. 8, a bending screen 104 provides a convenient graphic display to aid the technician in bending the club 12. The bending screen 104 displays the status of the clamping assembly 14 in text boxes 106, indicating overall status and whether the clamping assembly 14 and trunnions 42, 44 are locked. Using either the touch screen 34 or a keyboard 108 (FIGS. 1, 7) the technician can input the desired loft and lie. Optionally, the computer 26 can be connected to a network 109. e.g., the Internet, to receive desired angles directly from retailers or consumers. The bending screen 104 includes a bull's eye chart 110 having concentric rings 112 centered about a graphical center, i.e., a bull's-eye 114, representing the desired loft and lie. To input the desired loft and lie, the technician can first select, or input, the type of club 12 using series and club boxes 120 and input the desired offset of loft and lie using loft and lie boxes 116, 118, respectively. The chart 110 is a two-dimensional plane in which loft is defined along an x-axis and lie is defined along a y-axis. In this embodiment, the axes are not displayed. The club's real-time loft and lie are numerically displayed in measured loft and lie boxes 122 and 124. A circular shaft icon 126 graphically represents the real-time loft and lie relative to the bulls-eye. Even relatively subtle movement of the shaft 22 will cause movement of the shaft icon 126 in the bull's-eye chart 110. The technician can, therefore, test the bending direction prior to applying bending force and can monitor amount and duration of bending force until the desired loft and lie are achieved, as represented by guiding the shaft icon 126 into the bulls-eye center 114.

FIGS 9A–9D depict a preferred approach for determining the shaft line's orientation in the shaft-sensor coordinate system. Generally, the computer uses the captured image from the z-axis shaft camera 38 to approximate the positioning of the shaft line 28 in a shaft sensor coordinate system. Based upon the approximation, the computer 26 calculates how the shaft 12 would appear to the x-axis shaft camera 36 and compares that to the actual image. Differences between the calculated and actual images are used to iteratively refine the predicted location of the shaft 12. Preferably, the computer 26 is programmed to account for lens distortion attributable to the shaft cameras 36, 38.

Figure 9A:
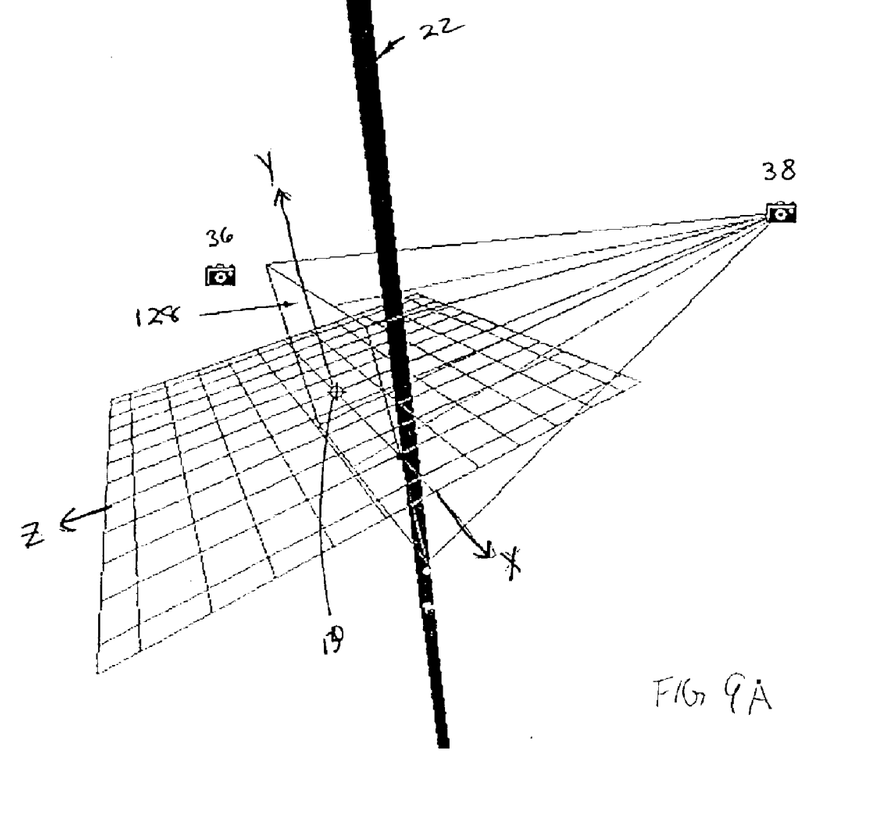
FIG. 9A is simplified perspective view of the shaft sensor system of the apparatus of FIG. 1, depicting a projected view area of a z-axis shaft camera.
Figure 9B:
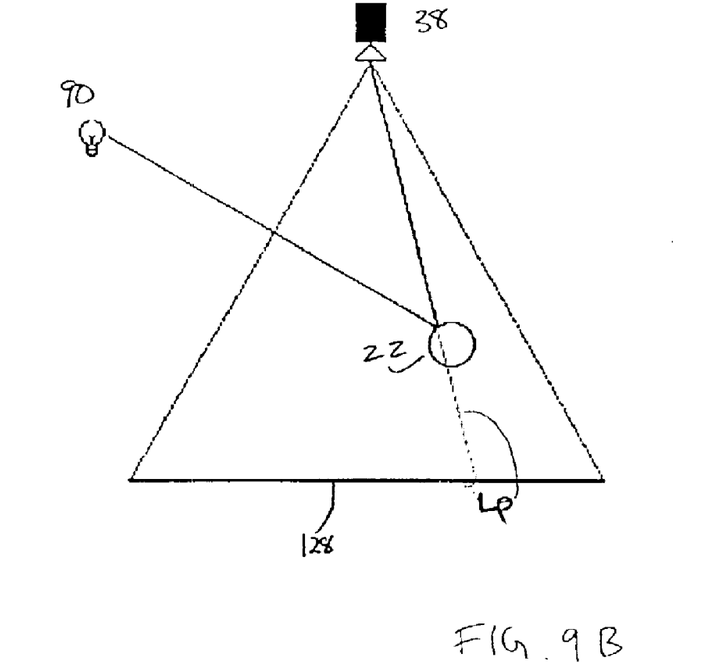
FIG. 9B is simplified overhead view of the z-axis shaft camera and the light source of the shaft sensor system of the apparatus of FIG. 1, depicting a projected view area of the z-axis shaft camera.

The shaft-sensor coordinate system is defined as a right-handed coordinate system having an x-axis extending from the origin 130 outwardly along the view line of the x-axis shaft camera 36. The z-axis extends from the origin 130 outwardly along the view line of z-axis shaft camera 38, and the y-axis is orthogonal to the x-z plane. Since the camera positions and view angles are known, a field of view of a known size, i.e., a projection area 128, for the z-axis shaft camera 38 can be defined in the x-y plane. The size of the projection area 128 can be defined in both pixels and centimeters, thereby allowing conversion from the captured image to the shaft-sensor coordinate system.

Figure 9C:
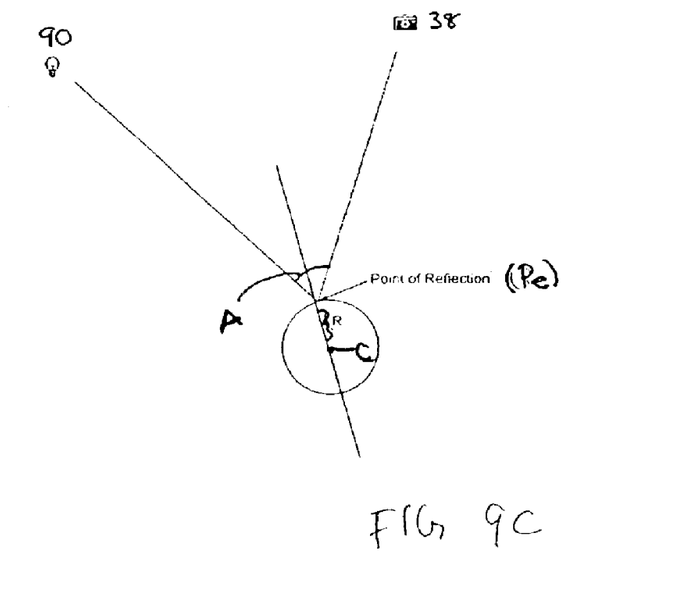
FIG. 9C is simplified overhead view of the z-axis shaft camera and the light source of the shaft sensor system of the apparatus of FIG. 1, depicting a bisecting line passing through the shaft center and reflection point.

As previously discussed the images from the shaft cameras 36, 38 are captured by frame grabbers 96. The captured images are processed to define points of reflected light. The points of reflected light from the z-axis shaft camera 38 are converted to the shaft sensor coordinate system by projecting the points onto the projection area 128. A projection line ($L_p$) is then defined extending from the z-axis shaft camera 38 to the projection point. The actual location of the shaft point is along this line. As depicted in FIG. 9C, given that the relative positions of the z-axis shaft camera 38 and shaft lighting device 90 are known, an estimated shaft center point (C) can be determined by bisecting an angle (A) originating at the point of reflected light. The estimated shaft center point (C) is located a distance from the reflection point along the bisecting plane equal to the shaft radius (r). A database having radius profiles for various types of club shafts 22 may be provided.

Figure 9D:
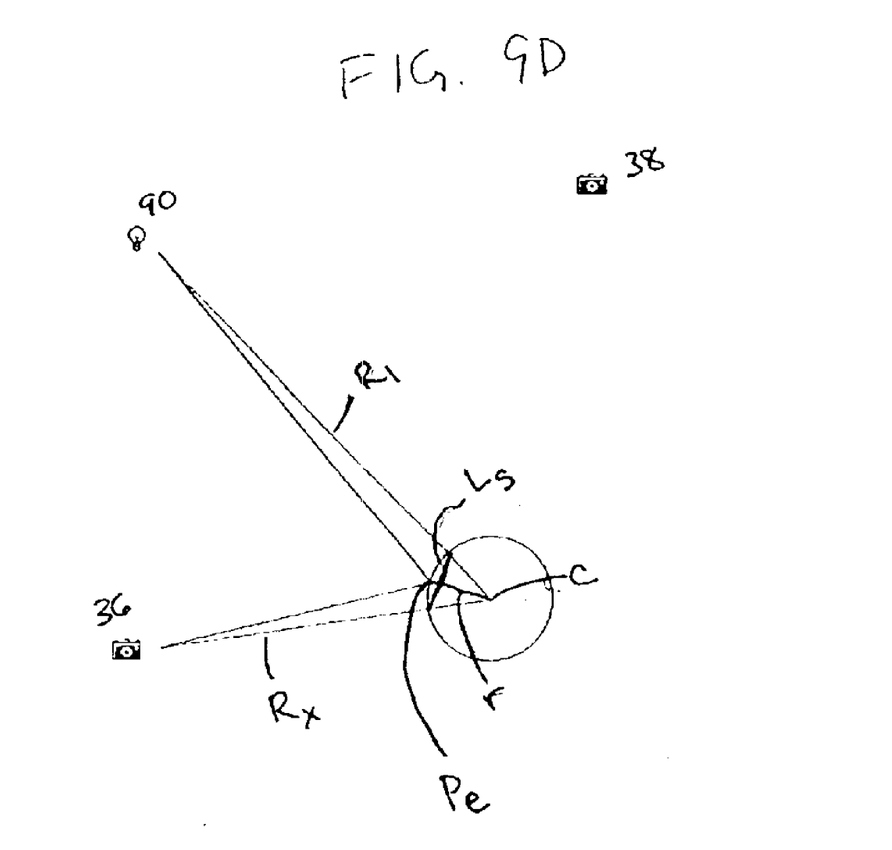
FIG. 9D is simplified overhead view of the shaft sensor system of the apparatus of FIG. 1, depicting a predicted reflection point as viewed from an x-axis shaft camera.

As depicted in FIG. 9D, a reflection point ($P_e$) as viewed by the x-axis shaft camera 36 can be predicted given the estimated shaft center point (C) and the positions of the shaft lighting device 90 and x-axis shaft camera 36. A ray ($R_l$) extending from the shaft lighting device 90 to the estimated shaft center point (C) is defined, and a ray ($R_x$) extending from the x-axis shaft camera 36 to the estimated center point (C) is also defined. A line segment ($L_s$) extending between intersection points of the rays ($R_l, R_x$) is defined. A radius (r) bisects the line segment ($L_s$) and defines the predicted reflection point ($P_e$). The predicted reflection point ($P_e$) is compared to the actual reflection point observed by the x-axis shaft camera 36. If the predicted reflection point ($P_e$) is to the right of the actual reflection point then the estimated shaft center point (C) is refined to be closer to the z-axis shaft camera 38 along the projection line ($L_p$). If the predicted reflection point ($P_e$) is to the left of the actual reflection point, then the estimated shaft center point (C) is refined to be farther from the z-axis shaft camera 38.

It should be appreciated from the foregoing that the present invention provides an apparatus and a related method for measuring and adjusting a golf club's loft and lie with improved accuracy and without unduly weakening the club. The apparatus includes a clamping assembly configured to secure a golf club head in a stationary position and a shaft sensor system spaced apart from the clamping assembly to provide a stereoscopic view of a shaft of the club. The apparatus further includes a computing device programmed to use information received from the shaft sensor system to provide real-time calculations of loft and lie angles of the club. In use, a technician can measure and adjust loft and lie without transferring the club from one device to another. Also, the progress toward achieving the desired loft and lie can be monitored while performing an adjustment. Moreover, the apparatus is relatively easy to use, thereby allowing even less skilled technicians to adjust loft and lie within tight tolerances.

The foregoing detailed description of the present invention is provided for the purposes of illustration and is not intended to be exhaustive or to limit the invention to the precise embodiments disclosed. Accordingly, the scope of the present invention is defined only by the claims set forth below.

We claim:

1. An apparatus for measuring loft and lie angles of a golf club comprising:
    a clamping assembly configured to secure a head of the golf club in a stationary position;
    a first camera and a second camera configured to provide a stereoscopic view of a shaft of a golf club secured by the clamping assembly, wherein a first camera orientation and a second camera orientation are known relative to the face of a club head secured by the clamping assembly; and
    a computing device programmed to use information received from the first and second cameras to calculate loft and lie angles of a golf club secured by the clamping assembly.

2. An apparatus as defined in claim 1, further comprising:
    a supporting structure coupled to the clamping assembly;
    a first sensor mounted to the clamping assembly and configured to sense orientation in two axes relative to gravity level; and
    a second sensor mounted to the supporting structure and configured to sense orientation in two axes relative to gravity level;
    wherein the first and second sensors are in communication with the computing device.

3. An apparatus as defined in claim 1, further comprising a clamp mount joining the clamping assembly to a supporting structure, the clamp mount having an x-axis trunnion and a y-axis trunnion to provide two degrees of freedom for the clamping assembly.

4. An apparatus as defined in claim 1, further comprising a light source for illuminating the shaft of the golf club secured by the clamping assembly.

5. An apparatus as defined in claim 4, wherein the first and second shaft cameras are fixed relative to a supporting structure and directionally oriented at a 90-degree angle relative to one another such that a resulting stereoscopic view is centered generally above the clamping assembly.

6. An apparatus as defined in claim 4, wherein the light source is a linear array of infrared lighting devices aligned orthogonally relative to a mounting plane of the first and second shaft cameras.

7. An apparatus as defined in claim 1, further comprising a face camera positioned to view a face of the golf club secured by the clamping assembly.

8. An apparatus as defined in claim 1, wherein the clamping assembly comprises:
    a face wall positioned to support a face of the club head and having a compliant contact surface for engaging the face;
    a side wall positioned to support a sole of a club head and having a compliant contact surface for engaging the sole; and
    at least one movable constraint block positioned in spaced relationship to the side wall to engage a top edge of the club head and having a compliant contact surface for engaging the top edge.

9. An apparatus as defined in claim 8, wherein the contact surfaces of the side wall and the movable constraint block are angled toward the face wall to encourage the face to mate flush with the face wall when the constraint block engages the second longitudinal edge of the club head.

10. An apparatus as defined in claim 1, further comprising a display in communication with the computing device for displaying the loft and lie angles of the golf club.

11. A method of measuring loft and lie angles of a golf club having a head and a shaft, the head having a face, the method comprising:
    securing the head in a clamping assembly;
    stereoscopically viewing the shaft with a first camera and a second camera, wherein the orientation of the first and second cameras is known relative to the face;
    directing stereoscopic information of the shaft from the first and second cameras to a computing device; and
    calculating loft and lie angles of the golf club using the computing device.

12. A method as defined in claim 11, further comprising:
    measuring the orientation of the clamping assembly in two axes relative to gravity;
    measuring the orientation of a supporting structure fixed relative to the first and second cameras in two axes relative to gravity; and determining the orientation of the first and second shaft cameras relative to the face.

13. A method as defined in claim 11, further comprising displaying the loft and lie angle of the golf club on a display in communication with the computing device.

14. A method as defined in claim 11, further comprising:

viewing the club face with a face camera; and directing information from the face camera to the computing device.

15. A method as defined in claim 11, wherein calculating loft and lie angles of the golf club using the computing device comprises:

capturing a first image of the shaft from the first camera;

determining an approximate shaft position in a shaft sensor coordinate system using the first image;

capturing a second image of the shaft from the second camera;

comparing the approximate shaft position with the second image; and determining the orientation of the shaft relative to the first and second cameras based upon the comparison.

* * * * *